(12) United States Patent
McBride (10) Patent No.: US 11,668,188 B2
(45) Date of Patent: Jun. 6, 2023

(54) DIFFERENTIAL VELOCITY SENSOR

(71) Applicant: Hunting Titan, Inc., Pampa, TX (US)

(72) Inventor: Gene McBride, Houston, TX (US)

(73) Assignee: Hunting Titan, Inc., Pampa, TX (US)

( * ) Notice: Subject to any disclaimer, the term of this patent is extended or adjusted under 35 U.S.C. 154(b) by 0 days.

(21) Appl. No.: 17/318,840

(22) Filed: May 12, 2021

(65) Prior Publication Data

US 2021/0324733 A1 Oct. 21, 2021

Related U.S. Application Data (62) Division of application No. 16/079,395, filed as application No. PCT/US2017/019190 on Feb. 23, 2017, now Pat. No. 11,293,277.

(60) Provisional application No. 62/298,782, filed on Feb. 23, 2016.

(51) Int. Cl.
| | |
|---|---|
| *E21B 47/092* | (2012.01) |
| *E21B 43/119* | (2006.01) |
| *E21B 47/0228* | (2012.01) |
| *E21B 47/024* | (2006.01) |
| *E21B 43/114* | (2006.01) |
| *E21B 43/117* | (2006.01) |
| *G01V 3/28* | (2006.01) |

(52) U.S. Cl.
CPC .......... *E21B 47/092* (2020.05); *E21B 43/114* (2013.01); *E21B 43/117* (2013.01); *E21B 43/119* (2013.01); *E21B 47/024* (2013.01); *E21B 47/0228* (2020.05); *G01V 3/28* (2013.01)

(58) Field of Classification Search
CPC .... E21B 43/114; E21B 43/117; E21B 43/119; E21B 47/024; E21B 47/0228; E21B 47/092; G01V 3/28
See application file for complete search history.

(56) References Cited

U.S. PATENT DOCUMENTS

| | | | | |
|---|---|---|---|---|
| 4,502,010 A | * | 2/1985 | Kuckes | G01V 3/24 324/346 |
| 4,747,317 A | | 5/1988 | Lara | |
| 6,712,159 B2 | | 3/2004 | Estes et al. | |
| 2009/0166035 A1 | | 7/2009 | Almaguer | |
| 2009/0195244 A1 | | 8/2009 | Mouget et al. | |
| 2010/0163224 A1 | * | 7/2010 | Strickland | E21B 47/09 166/55.1 |
| 2012/0013339 A1 | | 1/2012 | Kuckes | |

(Continued)

FOREIGN PATENT DOCUMENTS

WO 2012082304 A2 6/2012

OTHER PUBLICATIONS

Notification of international search report and written opinion of the international searching authority based on PCT/US2017/019190, dated Jun. 27, 2017, 16 pages.

(Continued)

*Primary Examiner* — Caroline N Butcher (57) ABSTRACT

A method, system, and apparatus for determining the location of a tool traveling down a wellbore by measuring a first borehole magnetic anomaly with respect to time at two known locations on a tool, comparing the time difference between the two measurements, then calculating the velocity of the tool based on the comparison and then further calculating the distance traveled by the tool in the wellbore based on the velocity calculation.

8 Claims, 8 Drawing Sheets

(56) References Cited

U.S. PATENT DOCUMENTS

| | | | |
|---|---|---|---|
| 2013/0118805 A1* | 5/2013 | Moody-Stuart | E21B 43/116 175/2 |
| 2014/0131035 A1 | 5/2014 | Entchev et al. | |
| 2014/0152298 A1* | 6/2014 | Hallunb | G01B 7/003 324/207.13 |
| 2014/0375468 A1* | 12/2014 | Wilkinson | E21B 47/01 73/866.5 |
| 2015/0083410 A1 | 3/2015 | Steele | |
| 2018/0023367 A1 | 1/2018 | Stair et al. | |

OTHER PUBLICATIONS

Supplementary European search report, European patent application No. EP17757233 dated Sep. 2, 2019, 8 pages.
Office action dated Jan. 30, 2019, Canadian patent application No. 3,015,356, 6 pages.
Response to Office action dated Jan. 30, 2019, Canadian patent application No. 3,015,356, dated Jul. 3, 2019, 6 pages.
Canadian office action dated Dec. 9, 2019, Canada Patent Application No. 3,015,356, 6 pages.
Response to Office action dated Dec. 9, 2019, Canadian patent application No. 3,015,356, dated Apr. 9, 2020, 9 pages.
Office action restriction requirement dated Apr. 13, 2020, U.S. Appl. No. 16/079,395, 7 pages.
Response to Office action restriction requirement dated Apr. 13, 2020, U.S. Appl. No. 16/079,395 dated Sep. 21, 2020, 21 pages.
Office action dated Dec. 15, 2020, U.S. Appl. No. 16/079,395, 34 pages.

* cited by examiner

DIFFERENTIAL VELOCITY SENSOR

RELATED APPLICATIONS

This application is a U.S. divisional of U.S. Non-provisional patent application Ser. No. 16/079,395 filed Aug. 23, 2019, which is a 371 of International Application No. PCT/US17/19190 filed Feb. 23, 2017, which claims priority to U.S. Provisional Application No. 62/298,782, filed on Feb. 23, 2016.

BACKGROUND OF THE INVENTION

Generally, when completing a subterranean well for the production of fluids, minerals, or gases from underground reservoirs, several types of tubulars are placed downhole as part of the drilling, exploration, and completions process. These tubulars can include casing, tubing, pipes, liners, and devices conveyed downhole by tubulars of various types. Each well is unique, so combinations of different tubulars may be lowered into a well for a multitude of purposes.

A subsurface or subterranean well transits one or more formations. The formation is a body of rock or strata that contains one or more compositions. The formation is treated as a continuous body. Within the formation hydrocarbon deposits may exist. Typically a wellbore will be drilled from a surface location, placing a hole into a formation of interest. Completion equipment will be put into place, including casing, tubing, and other downhole equipment as needed. Perforating the casing and the formation with a perforating gun is a well known method in the art for accessing hydrocarbon deposits within a formation from a wellbore.

Explosively perforating the formation using a shaped charge is a widely known method for completing an oil well. A shaped charge is a term of art for a device that when detonated generates a focused explosive output. This is achieved in part by the geometry of the explosive in conjunction with an adjacent liner. Generally, a shaped charge includes a metal case that contains an explosive material with a concave shape, which has a thin metal liner on the inner surface. Many materials are used for the liner; some of the more common metals include brass, copper, tungsten, and lead. When the explosive detonates the liner metal is compressed into a super-heated, super pressurized jet that can penetrate metal, concrete, and rock.

A perforating gun has a gun body. The gun body typically is composed of metal and is cylindrical in shape. Within a typical gun tube is a charge holder or carrier tube, which is a tube that is designed to hold the actual shaped charges. The charge holder will contain cutouts called charge holes where the shaped charges will be placed.

A shaped charge is typically detonated by a booster or igniter. Shaped charges may be detonated by electrical igniters, pressure activated igniters, or detonating cord. One way to ignite several shaped charges is to connect a common detonating cord that is placed proximate to the igniter of each shaped charge. The detonating cord is comprised of material that explodes upon ignition. The energy of the exploding detonating cord can ignite shaped charges that are properly placed proximate to the detonating cord. Often a series of shaped charges may be daisy chained together using detonating cord.

Another type of explosive used in completions is a jet cutter. This is an explosive that creates a radial explosion. It can be used to sever tubulars, including downhole casing.

A firing head is used to detonate the detonating cord in the perforating gun. The firing head may be activated by an electrical signal. Electricity may be provided by a wireline that ties into the cablehead at the top of a tool string. The electrical signal may have to travel through several components, subs, and tools before it gets to the firing head. A reliable electrical connector is needed to ensure the electrical signal can easily pass from one component to the next as it moves down the tool string. The electrical signal is typically grounded against the tool string casing. As a result, the electrical connections must be insulated from tool components that are in electrical contact with the tool string casing.

SUMMARY OF EXAMPLE EMBODIMENTS

An example embodiment may include an apparatus for use downhole including a top housing with a first end, a second end, an axis, a bottom housing with a first end located proximate to the second end of the top housing, and a second end, wherein the bottom housing is coaxial with the axis, a first magnetic anomaly sensor located within the top housing, a second magnetic anomaly sensor located within the bottom housing and located a fixed axial distance from the first magnetic anomaly sensor, and a processor located within the top housing, operatively connected to the first magnetic anomaly sensor and the second magnetic anomaly sensor, in which the processor calculates the velocity of the apparatus based on comparing measurements taken from the first magnetic anomaly sensor and the second magnetic anomaly sensor.

A variation of the example embodiment may include having a plurality of electromagnetic coils disposed within the first magnetic anomaly sensor. It may have a first electromagnetic coil disposed within the first magnetic anomaly sensor adapted to generate an electromagnetic field. There may be a second electromagnetic coil disposed within the first magnetic anomaly sensor adapted to generate an electromagnetic field. There may be a third electromagnetic coil disposed within the first magnetic anomaly sensor adapted to detect an electromagnetic field. There may be a fourth electromagnetic coil disposed within the first magnetic anomaly sensor adapted to detect an electromagnetic field. There may be a fifth electromagnetic coil disposed within the first magnetic anomaly sensor adapted to detect an electromagnetic field. There may be a sixth electromagnetic coil disposed within the first magnetic anomaly sensor adapted to detect an electromagnetic field.

A variation of the example embodiment may include a first sub coupled to the first end of the top housing. It may include a second sub coupled to the second end of the top housing and coupled to the first end of the bottom housing. It may include a third sub coupled to the second end of the bottom housing. The first centralizer may have a hollow cylindrical shape. The second centralizer may have a substantially hollow cylindrical shape.

A variation of the example embodiment may include a cylindrical core located coaxial with the axis and passing through the first, second, third, fourth, fifth, and sixth electromagnets. There may be a plurality of electromagnetic coils disposed within the second magnetic anomaly sensor. There may be a seventh electromagnetic coil disposed within the second magnetic anomaly sensor adapted to generate an electromagnetic field. It may have an eighth electromagnetic coil disposed within the second magnetic anomaly sensor adapted to generate an electromagnetic field. It may have a ninth electromagnetic coil disposed within the second magnetic anomaly sensor adapted to detect an electromagnetic field. It may have a tenth electromagnetic coil disposed within the second magnetic anomaly sensor adapted to detect an electromagnetic field. It may have an eleventh electromagnetic coil disposed within the second magnetic anomaly sensor adapted to detect an electromagnetic field. It may have a twelfth electromagnetic coil disposed within the second magnetic anomaly sensor adapted to detect an electromagnetic field.

A variation of the example embodiment may include a cylindrical core located coaxial with the axis and passing through the first, second, third, fourth, fifth, and sixth electromagnets. The processor includes a data logger. The processor may include a plurality of processors. The processor may compute the velocity by comparing measurements taken from the first magnetic anomaly sensor and the second magnetic anomaly sensor. It may include a first centralizer surrounding a portion of the first end of the top housing. It may include a second centralizer surrounding a portion of the second end of the top housing and a portion of the second end of the bottom housing. The top housing may be composed of a frangible material. The top housing may be composed of a ceramic material. The top housing may be composed of steel. The bottom housing may be composed of a frangible material. The bottom housing may be composed of a ceramic material. The bottom housing may be composed of steel. The processor may calculate distance traveled by integrating the calculated velocity with respect to time. The processor may calculate the distance traveled using a summation of the calculated velocity with respect to time. The processor may calculate the distance traveled by averaging the calculated velocity over a plurality of measurements and multiplying by time. The processor may calculate the distance traveled using a piecewise summation with respect to time.

An example embodiment may include an apparatus for use downhole including a cylindrical housing with a first end, a second end, an axis, a first magnetic anomaly sensor located within the cylindrical housing, a second magnetic anomaly sensor located within the cylindrical housing and located a fixed axial distance from the first magnetic anomaly sensor, and a processor located within the cylindrical housing, operatively connected to the first magnetic anomaly sensor and the second magnetic anomaly sensor, in which the processor compares the measurements of the first magnetic anomaly sensor, the second magnetic anomaly sensor, the time differential of those measurements, and with the fixed axial distance between the two sensors, calculates the instantaneous velocity of the tool.

A variation of the example may include having a plurality of processors. It may have stored log data of the wellbore and compare that to the two measurements to fine tune the velocity calculation. The first magnetic anomaly sensor may include a plurality of electromagnetic coils oriented about the axis. The second magnetic anomaly sensor may include a plurality of electromagnetic coils wrapped oriented about the axis. The cylindrical housing may be composed of a frangible material. The cylindrical housing may be composed of a ceramic material. The cylindrical housing may be composed of steel. The processor may calculate the distance traveled by the tool based on the calculated instantaneous velocity. The processor may calculate the distance traveled by the tool by integrating the calculated velocity with respect to time. The processor may calculate the distance traveled by the tool using summation of the calculated velocity with respect to time. The processor may calculate the distance traveled by the tool by averaging the calculated velocity over a plurality of measurements and multiplying by time. The processor may calculate the distance traveled by the tool using a piecewise summation with respect to time.

An example embodiment may include a method for determining the location of a tool in a wellbore including measuring a first borehole magnetic anomaly with respect to time at a first location on a tool, measuring the first borehole magnetic anomaly with respect to time at a second location on a tool a predetermined distance from first location, comparing the time difference between the first magnetic anomaly at the first location with the first magnetic anomaly at the second location, calculating the velocity of the tool based on the comparison of the time difference of the first magnetic anomaly at the first location with the first magnetic anomaly at the second location, the time, and the distance between the first location and the second location, and calculating the distance traveled by the tool based on the velocity calculation.

A variation of the example embodiment may include executing a preprogrammed function when the tool travels a predetermined distance. It may include comparing the measured first magnetic anomaly at the first location with log data. It may correct the measured first magnetic anomaly at the first location with log data. It may compare the measured first magnetic anomaly at the second location with log data. It may correct the measured first magnetic anomaly at the second location with log data. It may measure time to determine the time differential between the measurement at the first location and the measurement at the second location. It may generate a first electromagnetic field. It may generate a second electromagnetic field. The calculation of the distance may include integrating the calculated velocity with respect to time. Calculating the distance may include summation of the calculated velocity with respect to time. Calculating the distance may include averaging the calculated velocity over a plurality of measurements and multiplying by time. Calculating the distance may include a piecewise summation with respect to time.

An example embodiment may be a system for use downhole including a plugging tool having a cylindrical housing, a first end, a distal end, an axis, and a packer, an autonomous tool with a first end, a second end, located coaxial with the axis, wherein the second end of the autonomous tool is coupled to the first end of the plugging tool, the autonomous tool further comprising, a top housing with a first end, a second end, located coaxial with the axis, a bottom housing with a first end located proximate to the second end of the top housing, and a second end, wherein the bottom housing is coaxial with the axis, a first magnetic anomaly sensor located within the first housing, a second magnetic anomaly sensor located with the second housing, and a processor located within the top housing, operatively connected to the first magnetic anomaly sensor and the second magnetic anomaly sensor, wherein the processor compares data from the first magnetic anomaly sensor and the second magnetic anomaly sensor to determine the velocity of the autonomous tool and then calculating the distance the autonomous tool has traveled downhole using the calculated velocity.

A variation of the example embodiment may have a plurality of electromagnetic coils disposed within the first magnetic anomaly sensor. A first electromagnetic coil may be disposed within the first magnetic anomaly sensor adapted to generate an electromagnetic field. A second electromagnetic coil may be disposed within the first magnetic anomaly sensor adapted to generate an electromagnetic field. A third electromagnetic coil may be disposed within the first magnetic anomaly sensor adapted to detect an electromagnetic field. A fourth electromagnetic coil may be disposed within the first magnetic anomaly sensor adapted to detect an electromagnetic field. A fifth electromagnetic coil may be disposed within the first magnetic anomaly sensor adapted to detect an electromagnetic field. A sixth electromagnetic coil may be disposed within the first magnetic anomaly sensor adapted to detect an electromagnetic field.

Further variations of the example embodiment may include a first sub being coupled to the first end of the top housing. A second sub may be coupled to the second end of the top housing and coupled to the first end of the bottom housing. A third sub may be coupled to the second end of the bottom housing. The first centralizer may have a hollow cylindrical shape. The second centralizer may have a substantially hollow cylindrical shape. A cylindrical core may be located coaxial with the axis and passing through the first, second, third, fourth, fifth, and sixth electromagnets. It may include a plurality of electromagnetic coils disposed within the second magnetic anomaly sensor. A seventh electromagnetic coil may be disposed within the second magnetic anomaly sensor adapted to generate an electromagnetic field. An eighth electromagnetic coil may be disposed within the second magnetic anomaly sensor adapted to generate an electromagnetic field. A ninth electromagnetic coil may be disposed within the second magnetic anomaly sensor adapted to detect an electromagnetic field. A tenth electromagnetic coil may be disposed within the second magnetic anomaly sensor adapted to detect an electromagnetic field. An eleventh electromagnetic coil may be disposed within the second magnetic anomaly sensor adapted to detect an electromagnetic field. A twelfth electromagnetic coil may be disposed within the second magnetic anomaly sensor adapted to detect an electromagnetic field.

Further variations of the example embodiment may include a cylindrical core located coaxial with the axis and passing through the first, second, third, fourth, fifth, and sixth electromagnets. The processor may include a data logger. The processor may include a plurality of processors. The processor may compute the velocity by comparing measurements taken from the first magnetic anomaly sensor and the second magnetic anomaly sensor. A first centralizer may surround a portion of the first end of the top housing. A second centralizer may surround a portion of the second end of the top housing and a portion of the second end of the bottom housing. The top housing may be composed of a frangible material. The top housing may be composed of a ceramic material. The top housing may be composed of steel. The bottom housing may be composed of a frangible material. The bottom housing may be composed of a ceramic material. The bottom housing may be composed of steel. The packer may be composed of metal. The packer may be composed of a hard rubber. A braking assembly may be coupled to the first end of the top housing. A jet cutter may be coupled to the braking assembly. A jet cutter may be coupled to autonomous tool.

Further variations of the disclosed embodiments may include the processor calculating the distance traveled by the tool based on the calculated instantaneous velocity. The processor may calculate the distance traveled by the tool by integrating the calculated velocity with respect to time. The processor may calculate the distance traveled by the tool using summation of the calculated velocity with respect to time. The processor may calculate the distance traveled by the tool by averaging the calculated velocity over a plurality of measurements and multiplying by time. The processor may calculate the distance traveled by the tool using a piecewise summation with respect to time.

An example embodiment may include a method for locating a downhole tool including inserting an autonomous tool into a borehole, moving the autonomous tool down the borehole, programming the autonomous tool to execute a command at a predetermined location within the borehole, detecting a set of borehole magnetic anomalies at a first location on the autonomous tool, detecting the set of borehole magnetic anomalies at a second location on the autonomous tool, comparing the detection at the first location with the detection at the second location, calculating the velocity of the autonomous tool based on the comparison the set of borehole magnetic anomalies measured at the first location and second location, calculating the position of the tool based on the calculated velocity, and automatically executing a command when the autonomous tool reaches a predetermined location.

A variation of the embodiment may include the autonomous tool generating an electromagnetic field at a first location in the autonomous tool. The autonomous tool may generate an electromagnetic field at a second location in the autonomous tool. It may detect casing collars based on the detected borehole magnetic anomalies. It may execute a command to fire a perforating gun. It may execute a command to deploy a brake assembly. It may execute a command to fire a pipe severing tool. It may executed a command to expand a plug within the borehole. It may move the autonomous tool by dropping it down a wellbore. Moving the autonomous tool may include pumping it down a wellbore. It may calculate the position by integrating the calculated velocity with respect to time. It may calculate the position by a summation of the calculated velocity with respect to time. It may calculate the position by averaging the calculated velocity over a plurality of measurements and multiplying by time. It may calculate the position of the tool using a piecewise summation with respect to time.

BRIEF DESCRIPTION OF THE DRAWINGS

For a thorough understanding of the present invention, reference is made to the following detailed description of the preferred embodiments, taken in conjunction with the accompanying drawings in which reference numbers designate like or similar elements throughout the several figures of the drawing. Briefly.

DETAILED DESCRIPTION OF EXAMPLES OF THE INVENTION

In the following description, certain terms have been used for brevity, clarity, and examples. No unnecessary limitations are to be implied therefrom and such terms are used for descriptive purposes only and are intended to be broadly construed. The different apparatus, systems and method steps described herein may be used alone or in combination with other apparatus, systems and method steps. It is to be expected that various equivalents, alternatives, and modifications are possible within the scope of the appended claims.

Figure 1:
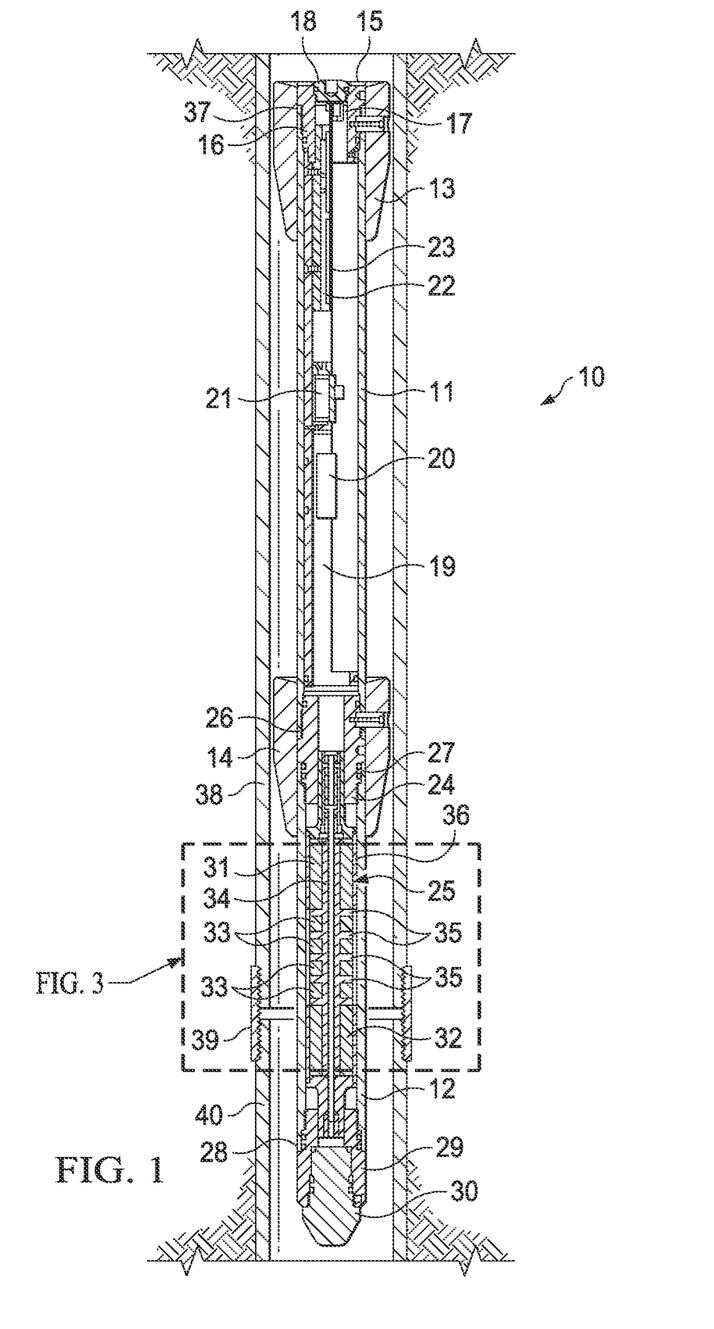
FIG. 1 shows a side view of an autonomous downhole tool.

An example embodiment is shown in FIG. 1 depicting an autonomous tool 10. The autonomous tool 10 has a first housing 11, a second housing 12, a first centralizer 13, and a second centralizer 14. The first housing 11 has a first end 37 and a second end 26. The first end 15 of the autonomous tool 10 ends with a top sub 16. The top sub 16 has a hollow center 17 with a wire port plug 18. The first housing 11 is hollow and contains a chassis 19 for holding a battery 20, data logger 21, and a printed circuit board (PCB) support 22. The PCB support contains a PCB 23.

Still referring to FIG. 1 a central sub 24 is coupled to the second end 26 of the first housing 11 and the first end 27 of the second housing 12. The second centralizer 14 is positioned over the first housing 11, second housing 12, and central sub 24. The central sub 24 is hollow to allow for electronic connections to connect components in the first housing 11 with components in the second housing 12. The second housing 12 contains a coil assembly 25. The second end 28 of the second housing 12 is coupled to a hollow bottom sub 29. A bull plug 30 is coupled to the bottom sub 29.

Still referring to FIG. 1 the coil assembly 25 has a housing 36, a core 34, a first transmitting coil 31, a second transmitting coil 32, receiving coils 33, and separators 35. Separators 35, core 34, and housing 36 may be constructed of a non-magnetic material.

The autonomous tool 10 is a casing collar locator. It can be lowered into a well using a wireline. The example embodiment shown may also operate autonomously without a wireline. An advantage to not using a wireline includes less surface equipment, fewer failure modes, and reduced cost. The autonomous tool can locate casing collars and count those casing collars to determine how far down the borehole the tool has traveled and determine its velocity through the borehole. The disclosed example embodiment uses six coils to detect casing collars. Another variation of the tool may include using four coils instead of six coils. As the autonomous tool 10 travels through a wellbore it passes a casing collar approximately every 40 feet of travel. The change in measured electromagnetic fields as the tool travels past a casing collar indicates that the tool is at the collar joint. By using a plurality of coils to detect collars the autonomous tool can measure collars with enough sensitivity to derive its velocity more accurately. By continuously deriving velocity through the borehole, the autonomous tool 10 can identify its position more accurately within a plus or minus ten foot length zone even though the distance between each collar is forty feet in length. Furthermore, there may be other borehole magnetic anomalies other than casing collars that the autonomous tool 10 may use to fine tune its calculations.

A variation of the autonomous tool 10 is to couple it to a frangible perforating gun. The tool 10 may be dropped into a well and pump down. The autonomous tool 10 could detect casing collars and other parameters to accurately determine its position. Once the autonomous tool 10 reaches its desired location it may then fire the perforating gun. The gun and autonomous tool 10 would then be destroyed in the process of perforating the well at a desired location. This variation of the autonomous tool 10 may function in a fire and forget perforating gun system.

A variation of the autonomous tool 10 may include the first housing 11 and the second housing 12 are composed of a frangible material may shatter when a proximately located perforating gun is fired. An example may include the autonomous tool 10 containing many components made of ceramic materials, including the first housing 11, the second housing 12, the chassis 19, the PCB support 22, the top sub 16, the central sub 24, the bottom sub 29, or the core 34. As an example the autonomous tool 10 is deployed in a wellbore having casing 38 and casing 40 joined by casing collar 39. A typical casing segment is 40 feet and each segment is typically joined by a collar.

Figure 2:
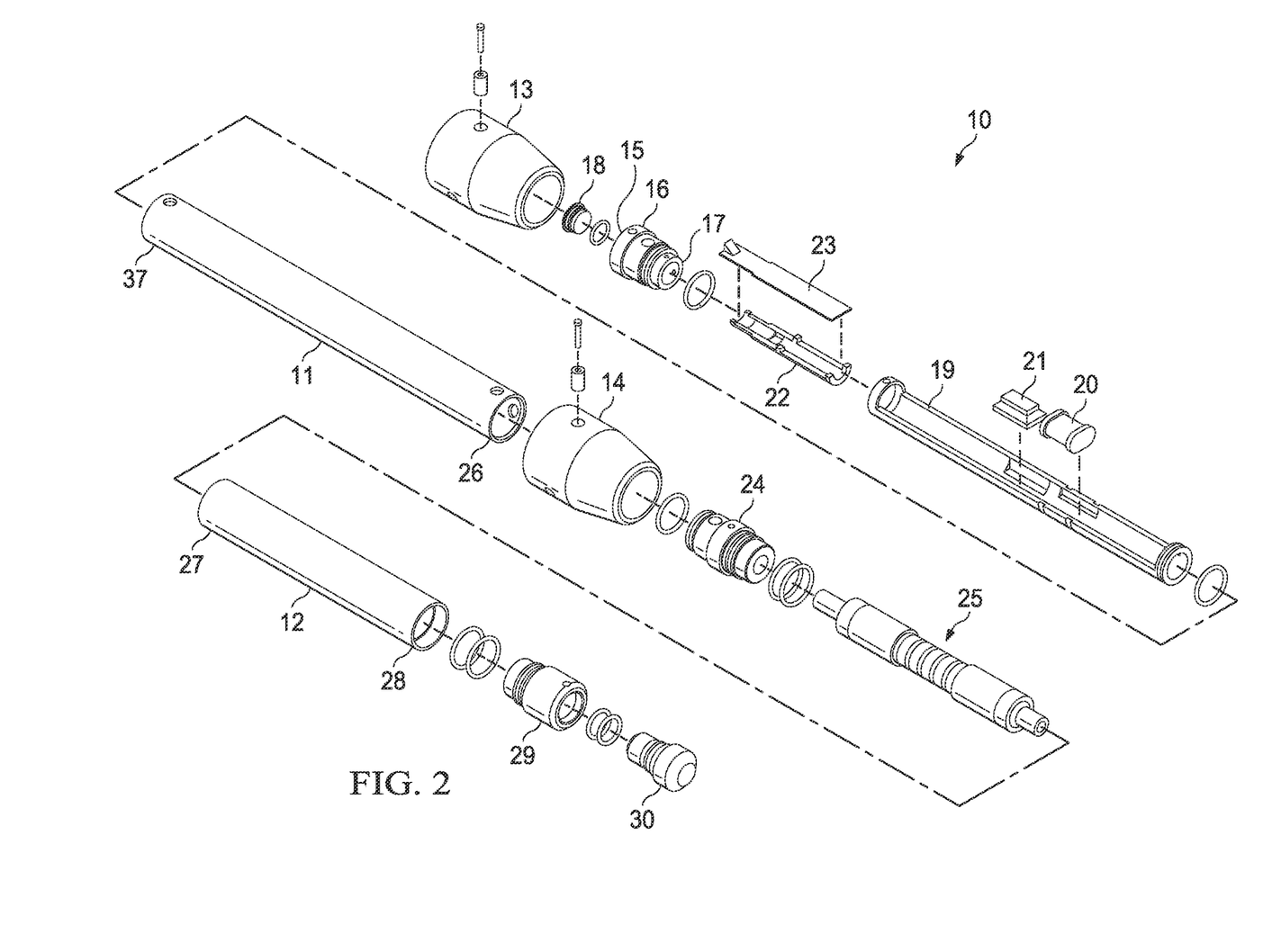
FIG. 2 an assembly view of an autonomous downhole tool.

An assembly view of the autonomous tool is shown in FIG. 2. The autonomous tool 10 has a first housing 11, a second housing 12, a first centralizer 13, and a second centralizer 14. The first housing 11 has a first end 37 and a second end 26. The first end 15 of the autonomous tool 10 ends with a top sub 16. The top sub 16 has a hollow center 17 with a wire port plug 18. The first housing 11 is hollow and contains a chassis 19 for holding a battery 20, data logger 21, and a printed circuit board (PCB) support 22. The PCB support contains a PCB 23. PCB 23 may include a processor or a plurality of processors and associated electronics. The processor may have memory for storing information, such as programming, logging information concerning borehole magnetic anomalies, or data recorded by the autonomous tool 10. A central sub 24 is coupled to the second end 26 of the first housing 11 and the first end 27 of the second housing 12. The second centralizer 14 is positioned over the first housing 11, second housing 12, and central sub 24. The central sub 24 is hollow to allow for electronic connections to connect components in the first housing 11 with components in the second housing 12. The second housing 12 contains a coil assembly 25. The second end 28 of the second housing 12 is coupled to a hollow bottom sub 29. A bull plug 30 is coupled to the bottom sub 29.

Figure 3:
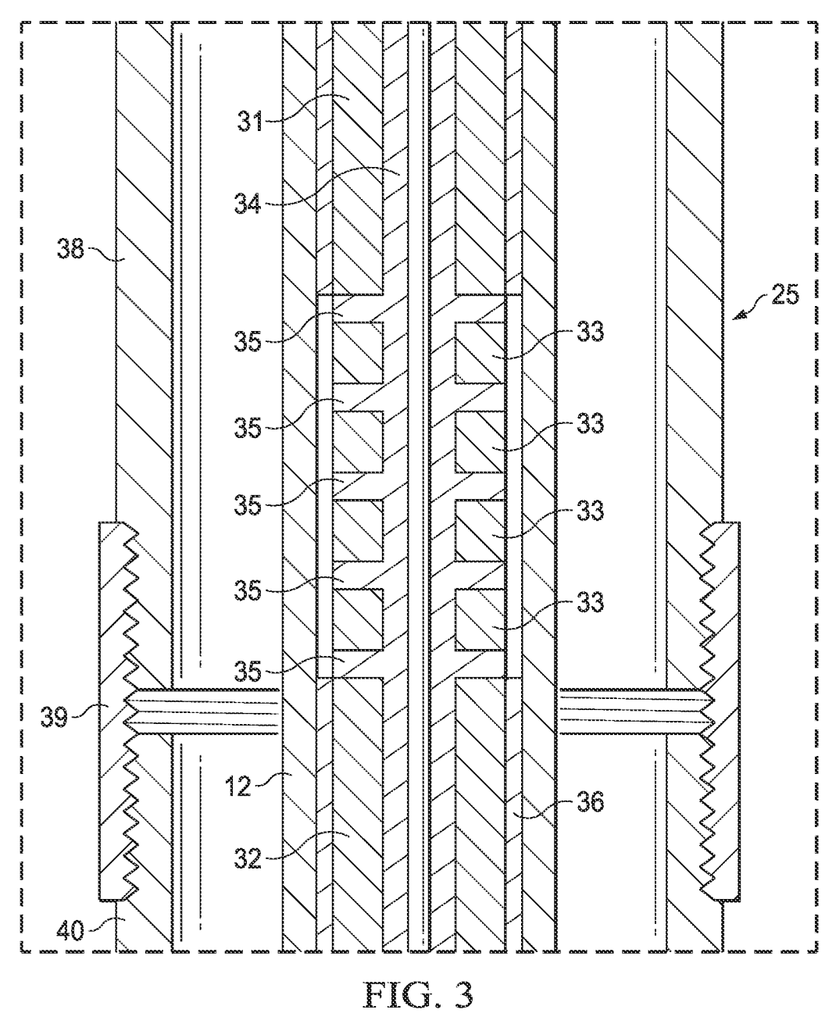
FIG. 3 shows a close up of a magnetic anomaly sensor used in an autonomous downhole tool.

A close up of an example embodiment of the magnetic anomaly sensor 25 is shown in FIG. 3. The coil assembly 25 has a housing 36, a core 34, a first transmitting coil 31, a second transmitting coil 32, receiving coils 33, and separators 35. Separators 35, core 34, and housing 36 may be constructed of a non-magnetic material, such as a ceramic. There are no magnets in this design, thus allowing it to be used in a disposable tool that can be destroyed or left in the wellbore.

Figure 4:
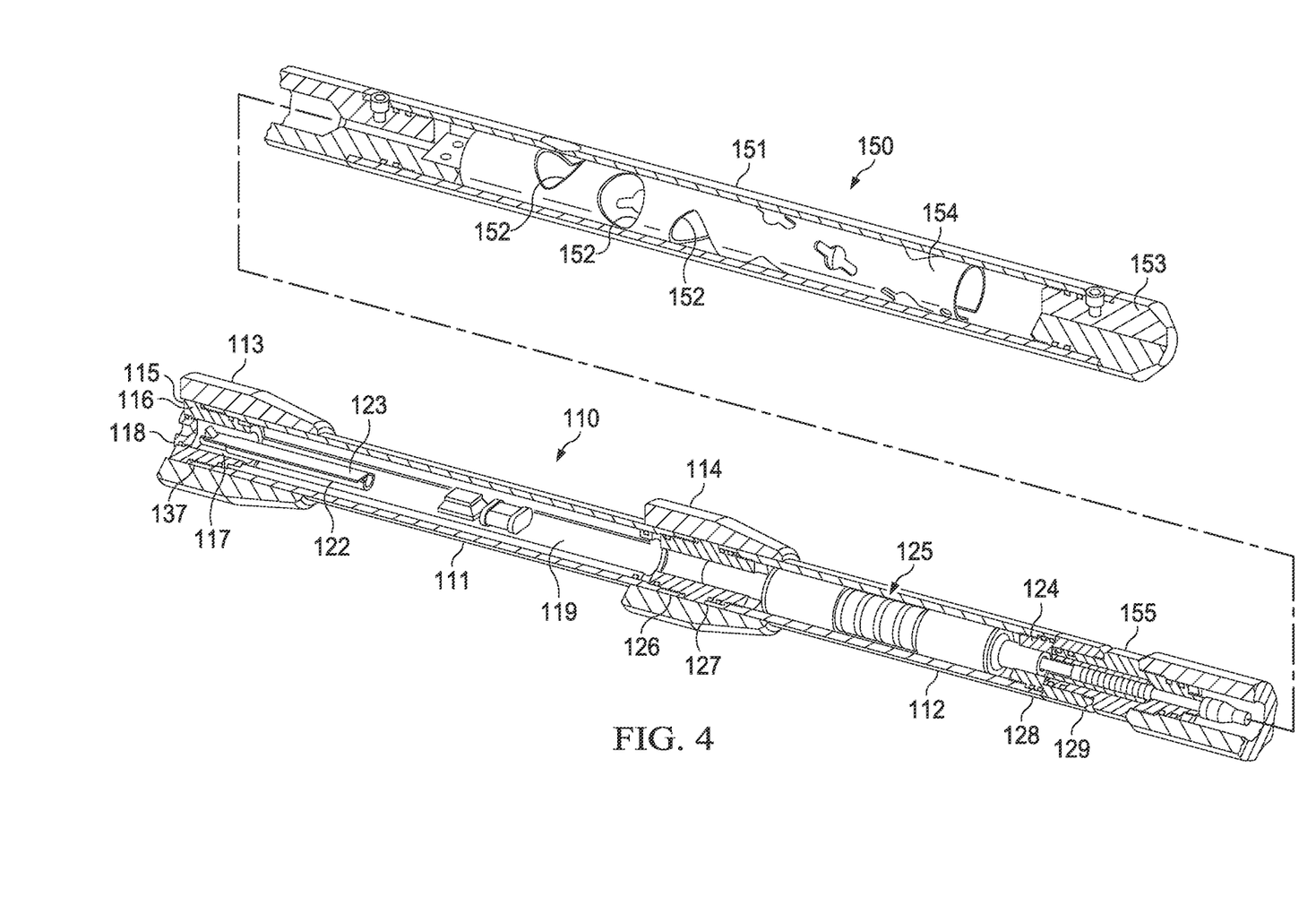
FIG. 4 shows an autonomous tool combined with a perforating gun.

An assembly view of the autonomous tool combined with a perforating gun is shown in FIG. 4. The autonomous tool 110 has a first housing 111, a second housing 112, a first centralizer 113, and a second centralizer 114. The first housing 111 has a first end 137 and a second end 126. The first end 115 of the autonomous tool 110 ends with a top sub 116. The top sub 116 has a hollow center 117 with a wire port plug 118. The first housing 111 is hollow and contains a chassis 119 for holding a battery and a data logger. It also contains a printed circuit board (PCB) support 122. The PCB support contains a PCB 123. A central sub 124 is coupled to the second end 126 of the first housing 111 and the first end 127 of the second housing 112. The second centralizer 114 is positioned over the first housing 111, second housing 112, and central sub 124. The central sub 124 is hollow to allow for electronic connections to connect components in the first housing 111 with components in the second housing 112. The second housing 112 contains a sensor 125. The second end 128 of the second housing 112 is coupled to a hollow bottom sub 129. A perforating gun 150 is coupled to the bottom sub 129 using connecting sub 155. The perforating gun 150 has a housing 151, a charge holder 154, and shaped charge holes 152. Shaped charges are placed in the shaped charge holes 152. In this configuration the autonomous tool may be dropped or pumped downhole. The perforating gun 150 has a bull plug 153. The sensor 125 may detect borehole magnetic anomalies and use that information to determine its location in a wellbore. The autonomous tool may have a second sensor located in the first housing 111. It may then compare the measurements between the two sensors and compute its velocity by knowing the distance between the two sensors. It may also compare the measurements to data stored in the data logger to reconcile any discrepancies. By integrating the velocity over time the data logger or other processors located within the autonomous tool 110 may determine the distance it has traveled.

Figure 5:
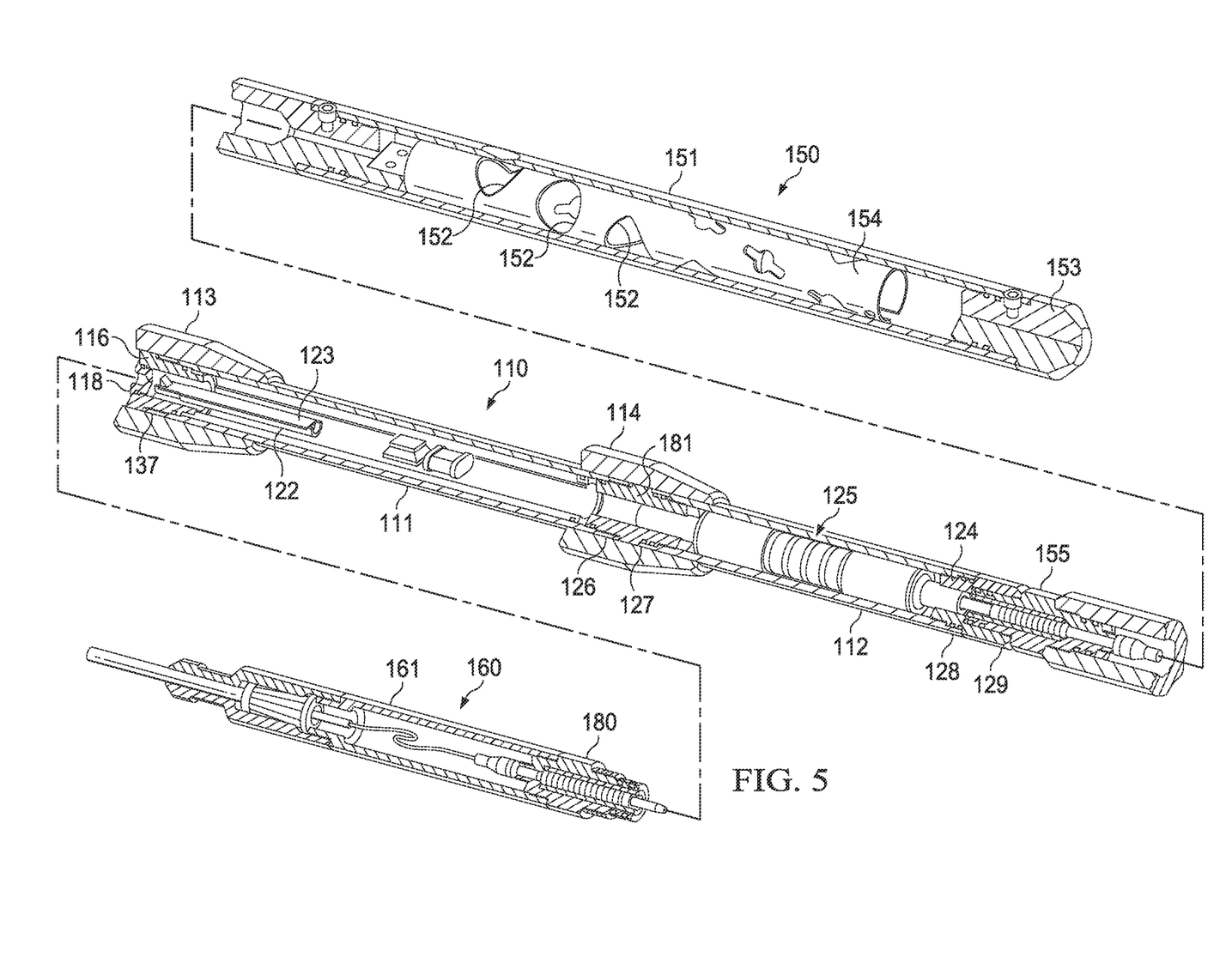
FIG. 5 shows an autonomous tool combined with a perforating gun and wireline cablehead.

An alternative embodiment of the autonomous tool is depicted in FIG. 5. In this example the autonomous tool 110 coupled to a perforating gun 150, but in this example it is suspended by a wireline via cablehead 160 with a housing 161 attached to the autonomous tool 110 using connecting sub 180.

Figure 6:
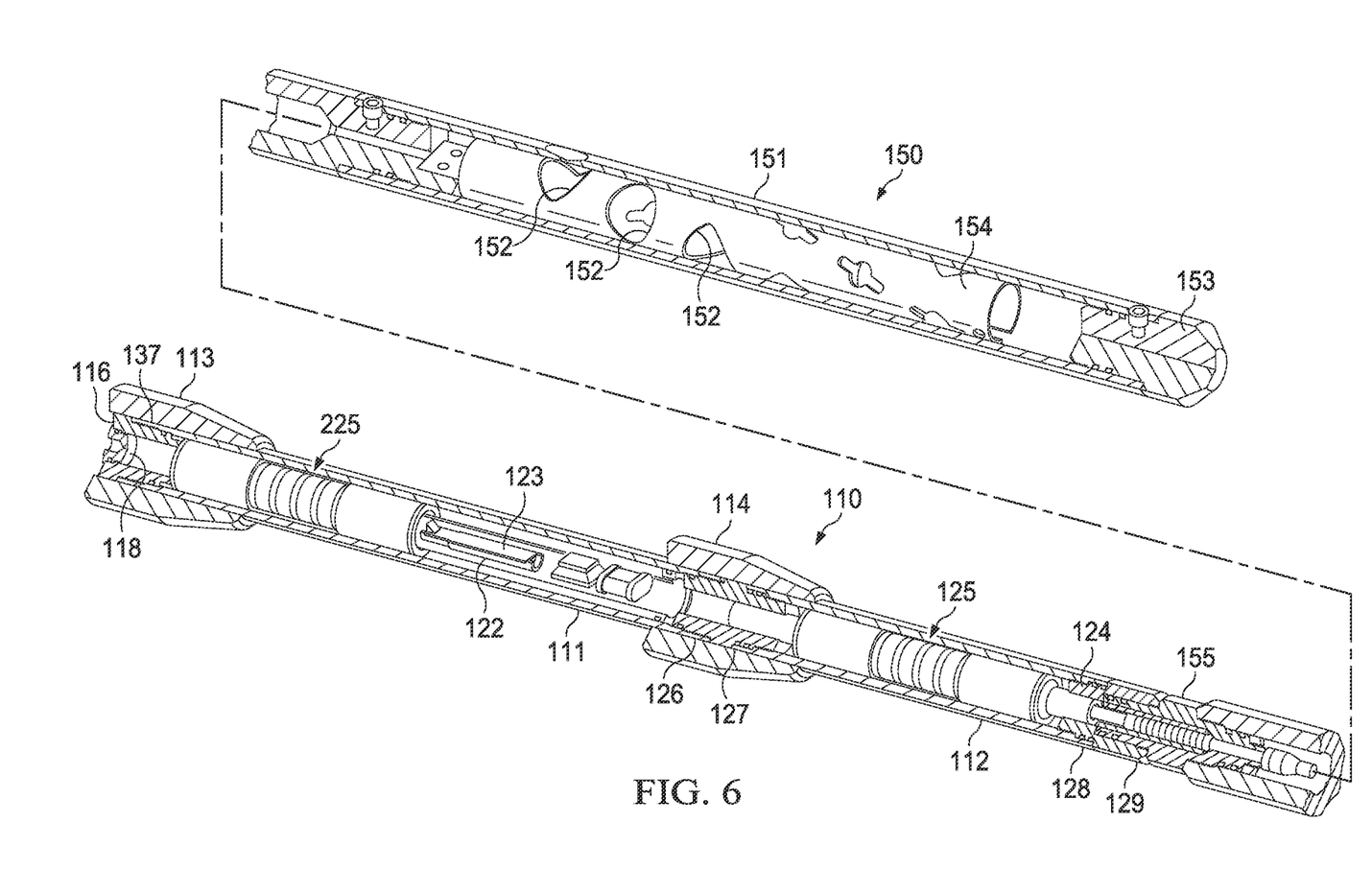
FIG. 6 shows an autonomous tool with two magnetic anomaly sensors spaced a fixed axial distance apart.

An assembly view of an example embodiment includes an autonomous tool 110 with two magnetic anomaly sensors combined with a perforating gun 150 is shown in FIG. 6. In this configuration there is a first sensor 225 located in the first housing 112, or the top housing, and a second sensor 125 located in the second housing 112, or the bottom housing. Sensors 225 and 125 may be magnetic anomaly detectors. In this configuration there is a fixed distance between the first sensor 225 and the second sensor 125. The autonomous tool 110 may include a microprocessor and other auxiliary electronics on the PCB 123 that can compare the measurements made by the first sensor 225 and the second sensor 112. The autonomous tool 110 may then compute its velocity by knowing the distance between the two sensors and measuring the time difference between the measurements made by the first sensor 225 and the second sensor 112. The processor may also compare the measurements to data stored on board to reconcile any discrepancies. By integrating the velocity over time the data logger or other processors located within the autonomous tool 110 may determine the distance it has traveled. The processor may calculate distance traveled by integrating the calculated velocity with respect to time. The processor may calculate the distance traveled using a summation of the calculated velocity with respect to time. The processor may calculate the distance traveled by averaging the calculated velocity over a plurality of measurements and multiplying by time. The processor may calculate the distance traveled using a piecewise summation with respect to time. The processor may calculate or estimate distance traveled by comparing magnetic anomaly data received by first sensor 225 and second sensor 125.

Figure 7:
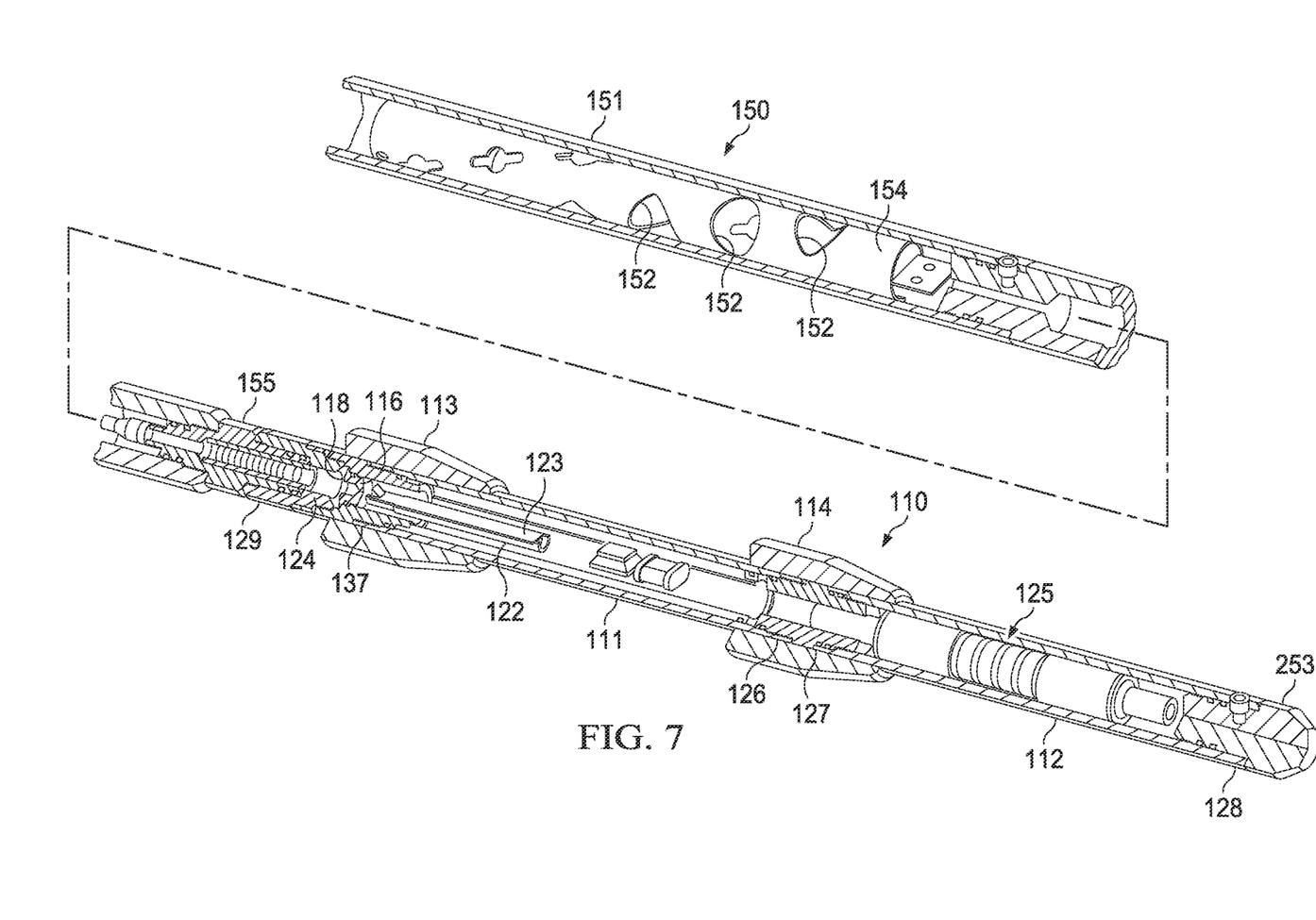
FIG. 7 shows an autonomous tool combined with a perforating gun in a different configuration.

An assembly view of an example embodiment includes an autonomous tool 110 with a perforating gun 150 installed at its first end is shown in FIG. 7. This is another configuration that may be desired depending on the job at hand. Several different tools can be attached to the autonomous tool including perforating guns, setting plugs, jet cutters, braking tools, liner hangers, or other completions tools used in a wellbore. Here the autonomous tool 110 has a bull plug 253.

Figure 8:
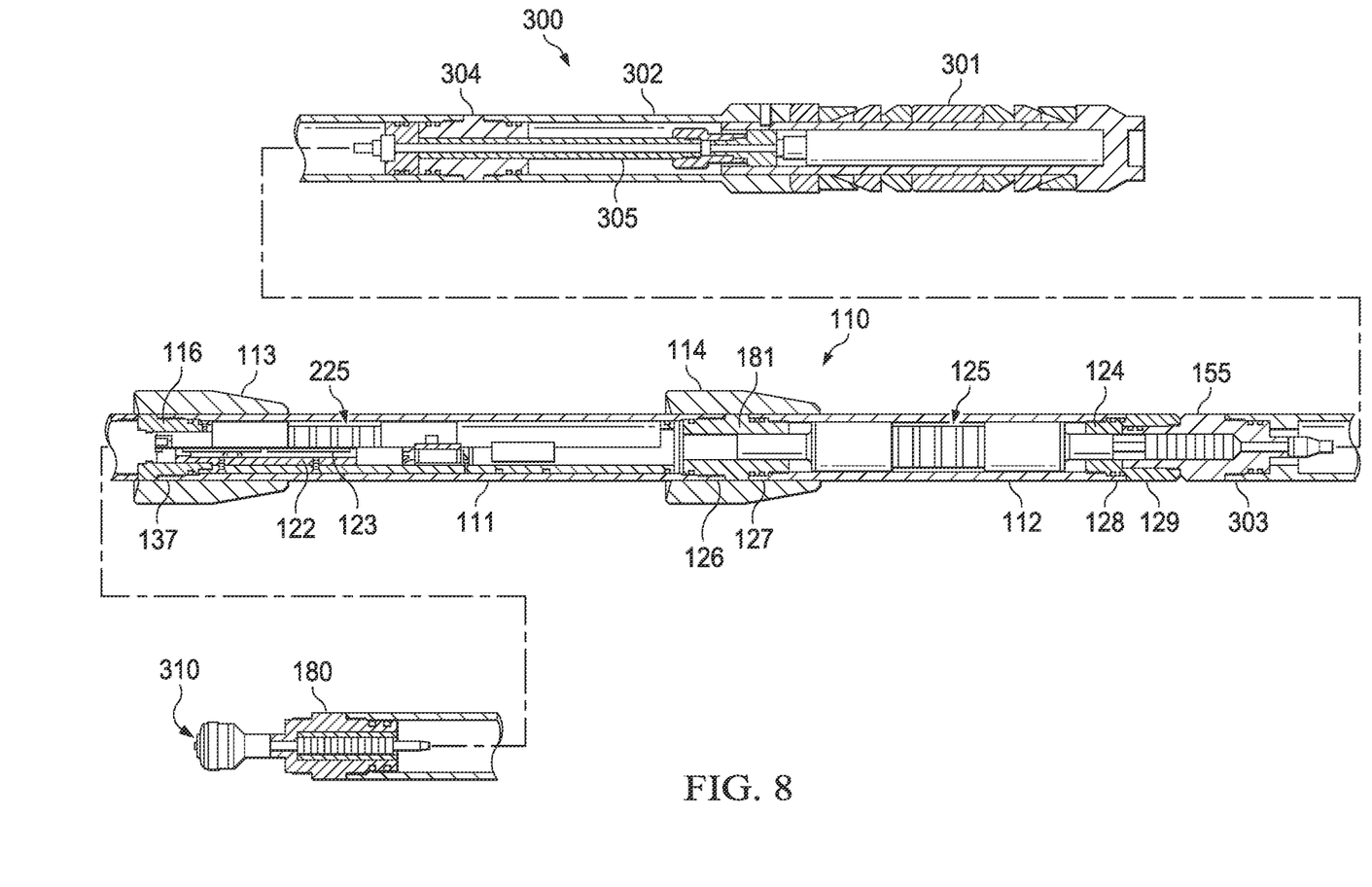
FIG. 8. Shows an autonomous tool with two magnetic anomaly sensors combined with a setting tool and a jet cutter.

An example embodiment may include the autonomous tool 110 as shown in FIG. 8 with a setting tool 300 coupled on the bottom sub 129 and a jet cutter 310 coupled to the top sub 116. A brake assembly may also be attached at a desirable location, such as in between the autonomous tool 110 and the jet cutter 310. In this configuration the autonomous tool 110 is dropped downhole or pump downhole. The sensor 125 and sensor 225 provide the information needed for the on board electronics to determine its location in the wellbore. Once the autonomous tool 110 determines it has reached a desired location it will deploy a brake. Then it will engage the setting tool 300 via connecting sub 303, causing seal 301 to engage the wellbore. Seal 301 may be a metal seal, a packer, a rubber seal, or a combination of various materials in a multitude of shapes for the purpose of sealing a wellbore. The setting tool 300 has a piston 304, a rod 305 that collapses the seal 301 by compressing it with housing 302, causing seal 301 to bulge out against a casing wall. Next the autonomous tool 110 will activate the jet cutter 310, which will sever the downhole tubulars, including the casing with explosives. The autonomous tool is then abandoned in place. The casing that was severed may then be pulled from the wellbore if necessary. In this operation the autonomous tool 110 works as a disposable plug and abandonment tool.

One of the purposes of the disclosed embodiments is to accurately identify casing collars as the tool is either freefalling or being pumped down a cased hole. Pumping the tool downhole may be necessary for horizontal wells. One issue is that there are other anomalies that may confuse a more traditional casing collar locator. The use of two differential spaced magnetic sensors and digital signal processing matching algorithms may continuously determine the velocity of the tool. The tool may then calculate the distance the tool has traveled. The distance calculation may include integrating the velocity over time, summation of the discrete velocity data, average the velocity information multiplied by time, or a piecewise summation method. The tool may start measuring velocity as soon as it enters the wellbore. The tool may use collars, anomalies, and/or both to determine velocity. By determining the distance traveled accurately, the tool can perform certain functions at a pre-determined location in the well including setting a plug, cutting pipe, or detonating a perforating gun.

Although the invention has been described in terms of particular embodiments which are set forth in detail, it should be understood that this is by illustration only and that the invention is not necessarily limited thereto. For example, terms such as upper and lower can be substituted with uphole and downhole, respectfully. Top and bottom could be left and right. The first housing and second housing may be top housing and bottom housing, respectfully. Terms like wellbore, borehole, well, bore, oil well, and other alternatives may be used synonymously. The alternative embodiments and operating techniques will become apparent to those of ordinary skill in the art in view of the present disclosure. Accordingly, modifications of the invention are contemplated which may be made without departing from the spirit of the claimed invention.

What is claimed is:

1. An apparatus for use downhole comprising:
a cylindrical housing, composed of a frangible material, with a first end, a second end, a centerline axis;
a first magnetic anomaly sensor located within the cylindrical housing, wherein the first magnetic anomaly sensor comprises a plurality of electromagnetic coils oriented about the centerline axis;
a second magnetic anomaly sensor located within the cylindrical housing and located a fixed axial distance from the first magnetic anomaly sensor, wherein the second magnetic anomaly sensor comprises a plurality of electromagnetic coils wrapped oriented about the centerline axis; and a processor located within the cylindrical housing, operatively connected to the first magnetic anomaly sensor and the second magnetic anomaly sensor, wherein the processor compares the measurements of the first magnetic anomaly sensor, the second magnetic anomaly sensor, the time differential of those measurements, and with the fixed axial distance between the two sensors, calculates the instantaneous velocity of the tool.

2. The apparatus of claim 1 further comprising a plurality of processors.

3. The apparatus of claim 1 further comprising the processor having stored log data of the wellbore and comparing that to the two measurements to fine tune the velocity calculation.

4. The apparatus of claim 1 wherein the processor calculates the distance traveled by the tool based on the calculated instantaneous velocity.

5. The apparatus of claim 1 wherein the processor calculates the distance traveled by the tool by integrating the calculated velocity with respect to time.

6. The apparatus of claim 1 wherein the processor calculates the distance traveled by the tool using summation of the calculated velocity with respect to time.

7. The apparatus of claim 1 wherein the processor calculates the distance traveled by the tool by averaging the calculated velocity over a plurality of measurements and multiplying by time.

8. The apparatus of claim 1 wherein the processor calculates the distance traveled by the tool using a piecewise summation with respect to time.

\* \* \* \* \*